US010402244B2

(12) United States Patent
Neuvirth-Telem et al.

(10) Patent No.: US 10,402,244 B2
(45) Date of Patent: *Sep. 3, 2019

(54) DETECTION OF ABNORMAL RESOURCE USAGE IN A DATA CENTER

(71) Applicant: Microsoft Technology Licensing, LLC, Redmond, WA (US)

(72) Inventors: Hani Neuvirth-Telem, Tel Aviv (IL); Amit Hilbuch, Kfar Saba (IL); Shay Baruch Nahum, Netanya (IL); Yehuda Finkelstein, Aley Zahav (IL); Daniel Alon, Tel Mond (IL); Elad Yom-Tov, Hoshaya (IL)

(73) Assignee: MICROSOFT TECHNOLOGY LICENSING, LLC., Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/385,718

(22) Filed: Dec. 20, 2016

(65) Prior Publication Data

US 2017/0161127 A1 Jun. 8, 2017

Related U.S. Application Data

(63) Continuation of application No. 14/721,777, filed on May 26, 2015, now Pat. No. 9,665,460.

(51) Int. Cl.
*G06F 11/00* (2006.01)
*G06F 11/34* (2006.01)
(Continued)

(52) U.S. Cl.
CPC ............ *G06F 11/006* (2013.01); *G06F 11/00* (2013.01); *G06F 11/3051* (2013.01);
(Continued)

(58) Field of Classification Search
CPC .................................................. G05B 23/0283
See application file for complete search history.

(56) References Cited

U.S. PATENT DOCUMENTS

| 5,668,944 A | 9/1997 | Berry |
| 6,381,735 B1 | 4/2002 | Hunt |

(Continued)

FOREIGN PATENT DOCUMENTS

| GB | 2489319 A | 9/2012 | |
| WO | WO-2009082382 A1 * | 7/2009 | ............. G06Q 10/00 |

(Continued)

OTHER PUBLICATIONS

"International Preliminary Report on Patentability Issued in PCT Application No. PCT/US2016/033390", dated Mar. 14, 2017, 7 Pages.

(Continued)

*Primary Examiner* — Amine Riad

(57) ABSTRACT

A system for identifying abnormal resource usage in a data center is provided. In some embodiments, the system employs a prediction model for each of a plurality of resources and an abnormal resource usage criterion. For each of a plurality of resources of the data center, the system retrieves current resource usage data for a current time and past resource usage data for that resource. The system then extracts features from the past resource usage data for that resource, predicts using the prediction model for that resource usage data for the current time based on the extracted features, and determines an error between the predicted resource usage data and the current resource usage data. After determining the error data for the resources, the system determines whether errors satisfy the abnormal resource usage criterion. If so, the system indicates that an abnormal resource usage has occurred.

20 Claims, 9 Drawing Sheets

(51) Int. Cl.
*G06F 11/30* (2006.01)
*G06N 20/00* (2019.01)
*G06N 5/04* (2006.01)

(52) U.S. Cl.
CPC ...... *G06F 11/3447* (2013.01); *G06F 11/3452* (2013.01); *G06N 5/04* (2013.01); *G06N 20/00* (2019.01); *G06F 2201/86* (2013.01)

(56) References Cited

U.S. PATENT DOCUMENTS

| | | | |
|---|---|---|---|
| 6,691,067 B1 | 2/2004 | Ding et al. | |
| 7,254,750 B1 | 8/2007 | Okun et al. | |
| 7,480,919 B2 | 1/2009 | Bray et al. | |
| 7,506,215 B1 | 3/2009 | Maw et al. | |
| 7,539,907 B1 | 5/2009 | Johnsen et al. | |
| 7,668,769 B2 | 2/2010 | Baker et al. | |
| 7,818,145 B2* | 10/2010 | Wood | G06F 11/3447 |
| | | | 702/179 |
| 8,145,456 B2 | 3/2012 | Cherkasova et al. | |
| 8,260,603 B2* | 9/2012 | Cherkasova | G06F 11/3447 |
| | | | 703/23 |
| 8,346,691 B1 | 1/2013 | Subramanian et al. | |
| 8,412,945 B2 | 4/2013 | Sweet et al. | |
| 8,543,522 B2 | 9/2013 | Ryman-Tubb et al. | |
| 8,713,023 B1 | 4/2014 | Cormack et al. | |
| 8,873,813 B2 | 10/2014 | Tadayon et al. | |
| 9,015,536 B1 | 4/2015 | Ricken et al. | |
| 9,367,803 B2* | 6/2016 | Yadav | G06Q 10/00 |
| 9,665,460 B2* | 5/2017 | Neuvirth-Telem | |
| | | | G06F 11/3452 |
| 2001/0013008 A1 | 8/2001 | Waclawski | |
| 2002/0144178 A1 | 10/2002 | Castelli et al. | |
| 2005/0120111 A1 | 6/2005 | Bailey et al. | |
| 2006/0047478 A1 | 3/2006 | Di Palma et al. | |
| 2006/0224375 A1 | 10/2006 | Barnett et al. | |
| 2010/0023810 A1 | 1/2010 | Stolfo et al. | |
| 2010/0082290 A1* | 4/2010 | Wood | G06F 11/3428 |
| | | | 702/179 |
| 2011/0145657 A1 | 6/2011 | Bishop et al. | |
| 2012/0066554 A1 | 3/2012 | Ruiz | |
| 2012/0096320 A1 | 4/2012 | Caffrey | |
| 2012/0266026 A1 | 10/2012 | Chikkalingaiah et al. | |
| 2013/0086431 A1 | 4/2013 | Arndt et al. | |
| 2013/0091385 A1 | 4/2013 | Arndt et al. | |
| 2014/0058763 A1 | 2/2014 | Zizzamia et al. | |
| 2014/0143012 A1* | 5/2014 | Alon | G06Q 30/0202 |
| | | | 705/7.29 |
| 2014/0303961 A1 | 10/2014 | Leydon et al. | |
| 2015/0039334 A1 | 2/2015 | de Traversay et al. | |
| 2015/0317197 A1 | 11/2015 | Blair | |
| 2015/0355957 A1 | 12/2015 | Steiner et al. | |
| 2017/0078850 A1* | 3/2017 | Bostick | H04W 4/029 |

FOREIGN PATENT DOCUMENTS

| | | | | |
|---|---|---|---|---|
| WO | WO-2014102318 A1 * | 7/2014 | ............ | H04W 24/00 |
| WO | WO-2015179778 A1 * | 11/2015 | ............... | G06N 5/02 |

OTHER PUBLICATIONS

"Notice of Allowance Issued in U.S. Appl. No. 14/721,777," dated Oct. 7, 2016, 13 pages.

Aggarwal, Charu C., "On Abnormality Detection in Spuriously Populated Data Streams," In Proceedings of the SIAM International Conference on Data Mining, Apr. 21, 2005, pp. 80-91.

Barga, et al., "Real-Time Fraud Detection in the Cloud," Retrieved from <<http://cloudcomputing.sys-con.com/node/3110704>>, Jun. 27, 2014, 15 Pages.

Chandola, et al., "Anomaly Detection: A Survey," In Journal ACM Computing Surveys, vol. 41, Issue 3, Jul. 1, 2009, 58 Pages.

Fernandes, et al., "Security Issues in Cloud Environments: A Survey," In International Journal of Information Security, vol. 13, Issue 2, Apr. 2, 2015, 62 pages.

Gander, et al., "Anomaly Detection in the Cloud: Detecting Security Incidents via Machine Learning," in Proceedings of Joint workshop on Intelligent Methods for Software System Engineering, Aug. 27, 2012, 7 pages.

Koller, et al., "Probabilistic Graphical Models: Principles and Techniques," In Publication MIT Press, Jul. 31, 2009, 16 pages.

Leung, et al., "Unsupervised Anomaly Detection in Network Intrusion Detection Using Clusters," In Proceedings of 28th Australasian Computer Science Conference, Jan. 2005, 10 Pages.

Modi, et al., "A Survey of Intrustion Detection Techniques in Cloud," In Journal of Network and Computer Applications, vol. 36, Issue 1, Jan. 2013, 14 Pages.

"Data Analysis Techniques for Fraud Detection," Retrieved from <<https://en.wikipedia.org/wiki/Data_analysis_techniques_for fraud_detection>>, Retrieved on: Apr. 2, 2015, 6 Pages.

"International Search Report and Written Opinion Issued in PCT Application No. PCT/US2016/033390," dated Aug. 25, 2016, 11 Pages.

Romero, et al., "Multivariate Imputation of Qualitative Missing Data Using Bayesian Networks," In Proceedings of Soft Methodology and Random Information Systems, Sep. 2004, 8 Pages.

Zhang, et al., "A Taxonomy Framework for Unsupervised Outlier Detection Techniques for Multi-Type Data Sets," in Technical Report TR-CTIT-07-79, Nov. 20, 2007, 40 Pages.

"Office Action Issued in European Patent Application No. 16725735.1", dated Oct. 26, 2018, 3 Pages.

* cited by examiner

DETECTION OF ABNORMAL RESOURCE USAGE IN A DATA CENTER

BACKGROUND

A public cloud computing system ("a cloud") provides shared computing resources for use by customers. The computing resources of a cloud are hardware and software resources. The hardware resources include components of servers such as cores of central processing units (CPUs), graphics processing units (GPUs), main memory, secondary storage, and so on. The software resources include operating systems, database systems, accounting applications, and so on. A typical cloud may have several data centers at various locations throughout the world. Each data center may host tens of thousands of servers.

To use a cloud, a customer typically purchases a subscription to use the services of the cloud. When purchasing a subscription, a customer may provide billing information and be provided an account that is accessible using logon information such as a user name and password. To encourage users to become customers, a cloud provider may offer various incentives that allow the users to subscribe and use the cloud for a limited time. Once logged on, a customer can then use the servers of the cloud to execute computer programs such as for hosting websites, performing accounting functions, performing data analyses, and so on. A cloud may use various billing models such as model based on amount of core usage, memory usage, and other resource usage.

Clouds, like other computer systems, are susceptible to cyber-attacks. These cyber-attacks may include viruses, worms, denial-of-service attacks, and so on. Clouds are also susceptible to fraudulent use of resources resulting from exploitation of a vulnerability in the subscription process of the cloud. For example, a cloud may offer free 30-day subscriptions to new customers. When subscribing, the user may be provided with a Completely Automated Public Turing test to tell Computer and Humans Apart ("CAPTCHA") test. If the user discovers a vulnerability in the subscription process that allows the user to bypass or always pass the CAPTCHA test, that user may be able to develop a computer program to create hundreds and thousands of new, but unauthorized, subscriptions. As another example, a user may have access to valid, but stolen, credit card numbers. Such a user can create hundreds of subscriptions using the stolen credit card numbers before the theft is identified. Such unauthorized users can then use computer resources at such a high rate that there are insufficient resources left to service the needs of authorized users. To help lessen the impact of such unauthorized uses, a cloud may be designed with a certain amount of capacity that is in excess of what is needed to support authorized users. The price of purchasing and maintaining such excess capacity can be high.

SUMMARY

A system for identifying abnormal resource usage in a data center is provided. In some embodiments, the system employs a prediction model for each of a plurality of resources and an abnormal resource usage criterion. The prediction models are generated from resource usage data of the data center, and the abnormal resource usage criterion is established based on error statistics for the prediction models. For each of a plurality of resources of the data center, the system retrieves current resource usage data for a current time and past resource usage data for that resource. The system then extracts features from the past resource usage data for that resource, predicts using the prediction model for that resource usage data for the current time based on the extracted features, and determines an error between the predicted resource usage data and the current resource usage data. After determining the error data for the resources, the system determines whether errors satisfy the abnormal resource usage criterion. If so, the system indicates that an abnormal resource usage has occurred.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
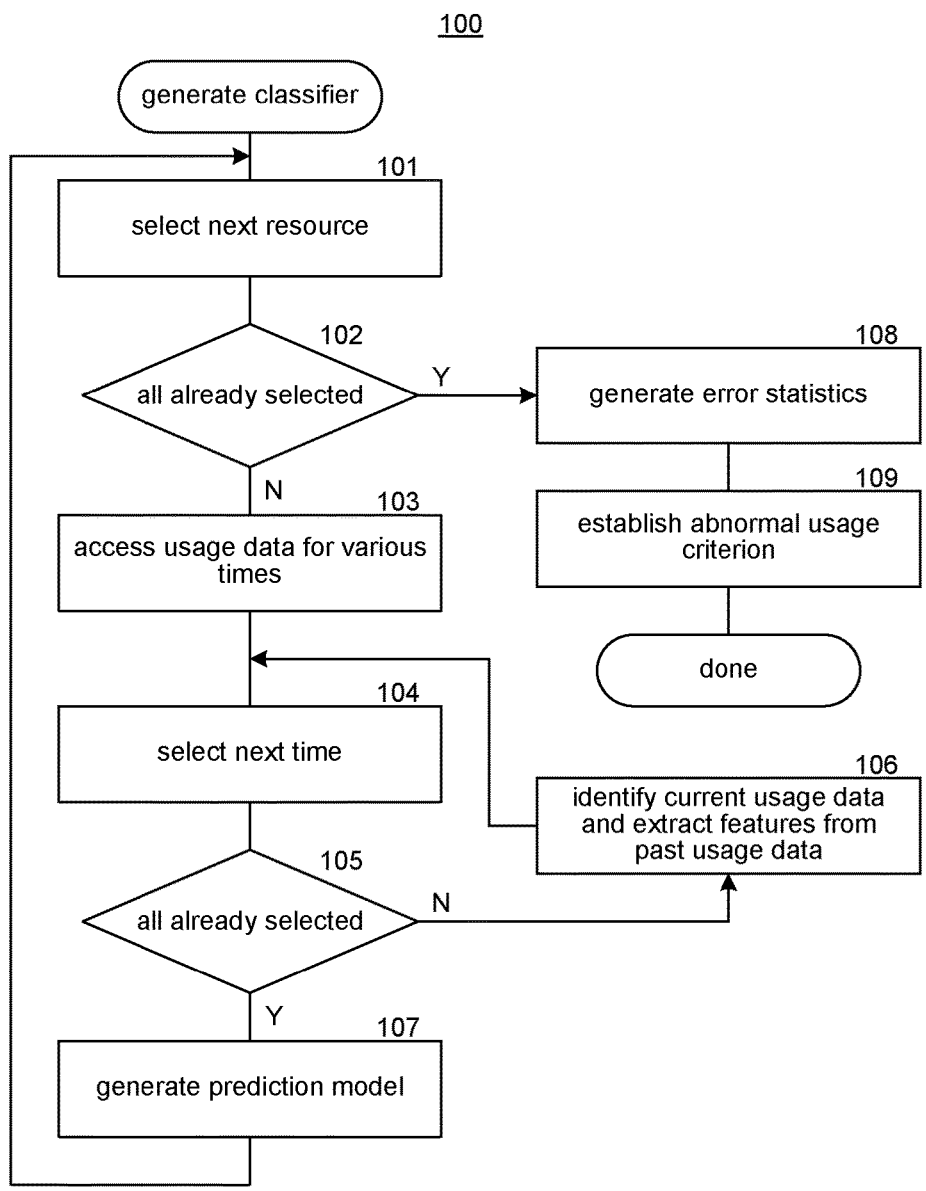
FIG. 1 is a flow diagram that illustrates the generating of a classifier in some embodiments of an abnormal activity detection ("AAD") system.

In some embodiments, an abnormal activity detection ("AAD") system detects when resource usage at a data center is so high that the resource usage is likely fraudulent. Such fraudulent usage may be referred to as a "fraud storm" at the data center because of the sudden onset of significant fraudulent use. The AAD system detects a fraud storm using a classifier to classify whether the current resource usage indicates abnormal activity resulting in abnormal resource usage at the data center. To generate the classifier, the AAD system may generate a prediction model for various resources to predict normal resource usage given past resource usage. The AAD system uses resources that are likely to increase during a fraud storm, such as number of cores in use, number of new subscriptions, amount of outbound traffic, amount of disk usage, and so on. The AAD system may also generate an error model to estimate the errors in the prediction models based on comparison of predicted resource usage and actual resource usage of past resource usage. To determine if abnormal activity is occurring at the current time, the AAD system applies the classifier to past resource usage. The classifier uses the prediction models to predict a predicted resource usage for the current time based on past resource usage and then determines an error between predicted resource usage and the current resource usage for each resource. If the errors satisfy an abnormal resource usage criterion, then the AAD system indicates that abnormal activity is occurring. When such abnormal activity is occurring, the provider of the cloud can take various steps to stop the abnormal activity such as revoking new subscriptions that appear to be fraudulently obtained, limiting the subscription rate, placing additional protections on the subscription process, identifying and correcting the vulnerability that led to the abnormal activity, and so on.

In some embodiments, the AAD system generates a classifier to identify abnormal resource usage in a data center based on resource usage data collected for various resources while normal activity was occurring. For each of the resources, the AAD system collects (e.g., is provided with data collected by the data center) resource usage data at various time intervals. For example, the interval may be one hour, and the resource usage data may include the average number of cores in use during that hour and the number of new subscriptions received during that hour. For each of the intervals, the AAD system identifies the current resource usage data for that resource and extracts features from past resource usage data for one or more resources. The extracted features may include average resource usage in the hours 1, 2, 4, and 8 hours ago and in the hours 1, 2, 4, 7, and 14 days ago. The extracted features may also include the average resource usage over the past 2, 4, 8, 12, 24, and 48 hours. Other features may be used from past resource usage data that may be indicative of the current resource usage data such as differences between resource usage data, variations in resource usage data, and so on. Also, the features may also include monthly and annual features to help account for seasonal variations.

The AAD system then generates a prediction model for each resource from the current resource usage data and the extracted features for predicting resource usage data for that resource at a current time given features extracted from past resource usage data. The prediction model can be generated using various regression models such as random forest regression, k-nearest neighbors regression, support vector machine (SVM) with radial basis function (RBF) kernel, linear regression, ridge linear regression, and so on. The AAD system also generates error statistics based on estimated errors in the prediction models derived from the collected resource usage data. For example, the error statistics may include mean and standard deviation of the errors for each resource and covariances of errors of resources. The AAD system then establishes from the error statistics an abnormal resource usage criterion that when satisfied indicates that the abnormal activity is occurring. For example, the abnormal resource usage criterion may be based on a p-value determined for some significance level. The AAD system may regenerate the classifier at various times such as periodically (e.g., weekly) or when certain events occur (e.g., a certain number of non-fraudulent new subscriptions are received).

In some embodiments, the AAD system identifies abnormal resource usage using the prediction models and the abnormal resource usage criterion. For each resource, the AAD system accesses current resource usage data for a current time and past resource usage data for the resources. The AAD system extracts features from the past resource usage data for these resources (i.e., features used to generate the classifier). The AAD system then uses the prediction model for that resource to predict predicted resource usage data for the current time based on the extracted features. The AAD system then determines an error between the predicted resource usage data and the current resource usage data. After determining the errors for each of the resources, the AAD system determines whether the determined errors satisfy the abnormal resource usage criterion. If so, the AAD system indicates that an abnormal resource usage is occurring.

FIG. 1 is a flow diagram that illustrates the generating of a classifier in some embodiments of the AAD system. In blocks 101-107, the AAD system generates a prediction model for each resource. In block 101, the AAD system selects the next resource. In decision block 102, if all the resources have already been selected, then the AAD system continues at block 108, else the AAD system continues at block 103. In block 103, the AAD system accesses resource usage data for the selected resource for various times. The resource usage data may be provided by a data center to the AAD system. In blocks 104-106, the component generates, for each time interval (e.g., every hour) with a window (e.g., 60 days), classification data that includes current resource usage data for that time interval and features extracted from past resource usage data. In block 104, the component selects the next time interval. In decision block 105, if all the time intervals have already been selected, then the AAD system continues at block 107, else the AAD system continues at block 106. In block 106, the AAD system identifies the current resource usage data for the time interval and extracts various features for the selected time interval from past resource usage data and then loops to block 104 to select the next time interval. In some embodiments, if the AAD system regenerates the classifier, then the AAD system need only generate classification data from the time the classifier was last generated. In block 107, the AAD system generates a prediction model for the selected resource and then loops to block 101 to select the next resource. In block 108, the AAD system generates error statistics for the prediction models. In block 109, the component establishes an abnormal resource usage criterion based on the error statistics and then completes.

Figure 2:
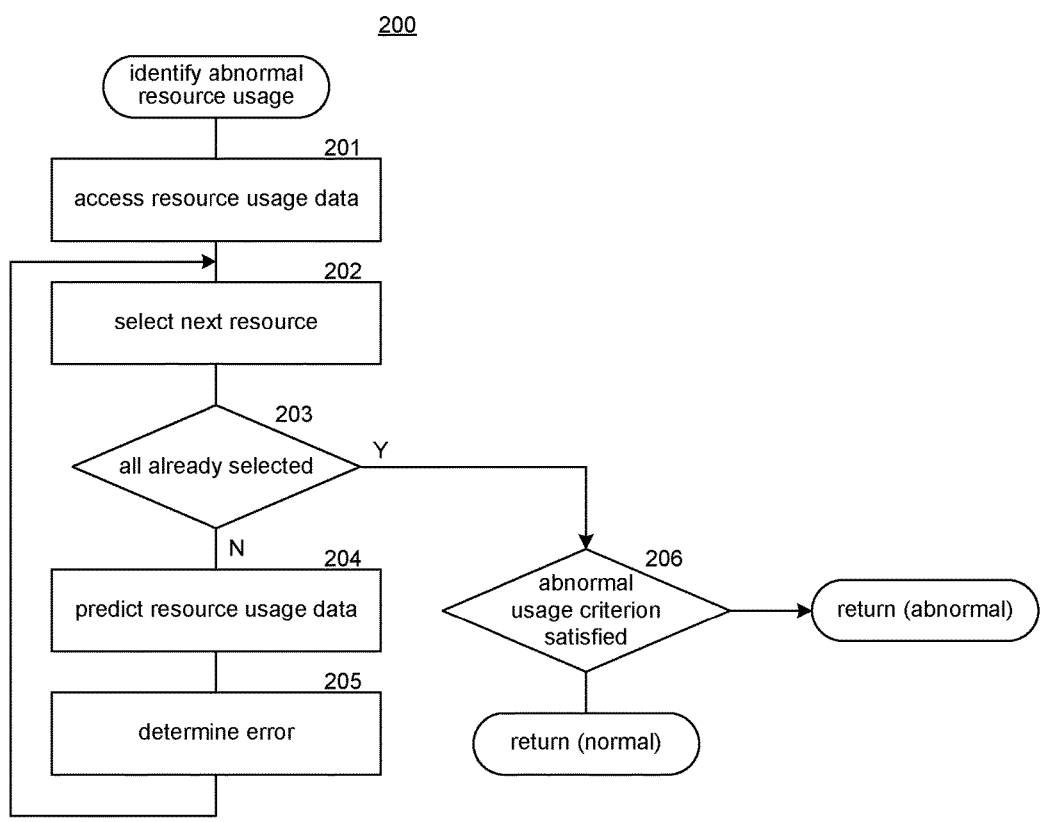
FIG. 2 is a flow diagram that illustrates the identifying of an abnormal resource usage in some embodiments of the AAD system.

FIG. 2 is a flow diagram that illustrates the identifying of an abnormal resource usage in some embodiments of the AAD system. The AAD system may perform this identifying at various time intervals (e.g., hourly). In block 201, the component accesses the resource usage data for the data center. In block 202, the AAD system selects the next resource. In decision block 203, if all the resources have already been selected, then the AAD system continues at block 206, else the AAD system continues at block 204. In block 204, the AAD system predicts resource usage data for the selected resource for the current time interval using the prediction model and features extracted from past resource usage data. In block 205, the AAD system determines the error between the predicted resource usage data and the current resource usage data for the time interval. The component then loops to block 202 to select the next resource. In decision block 206, if the abnormal usage criterion is satisfied by the determined errors, then the AAD system returns an indication of abnormal resource usage, else the AAD system returns an indication of normal resource usage.

Figure 3:
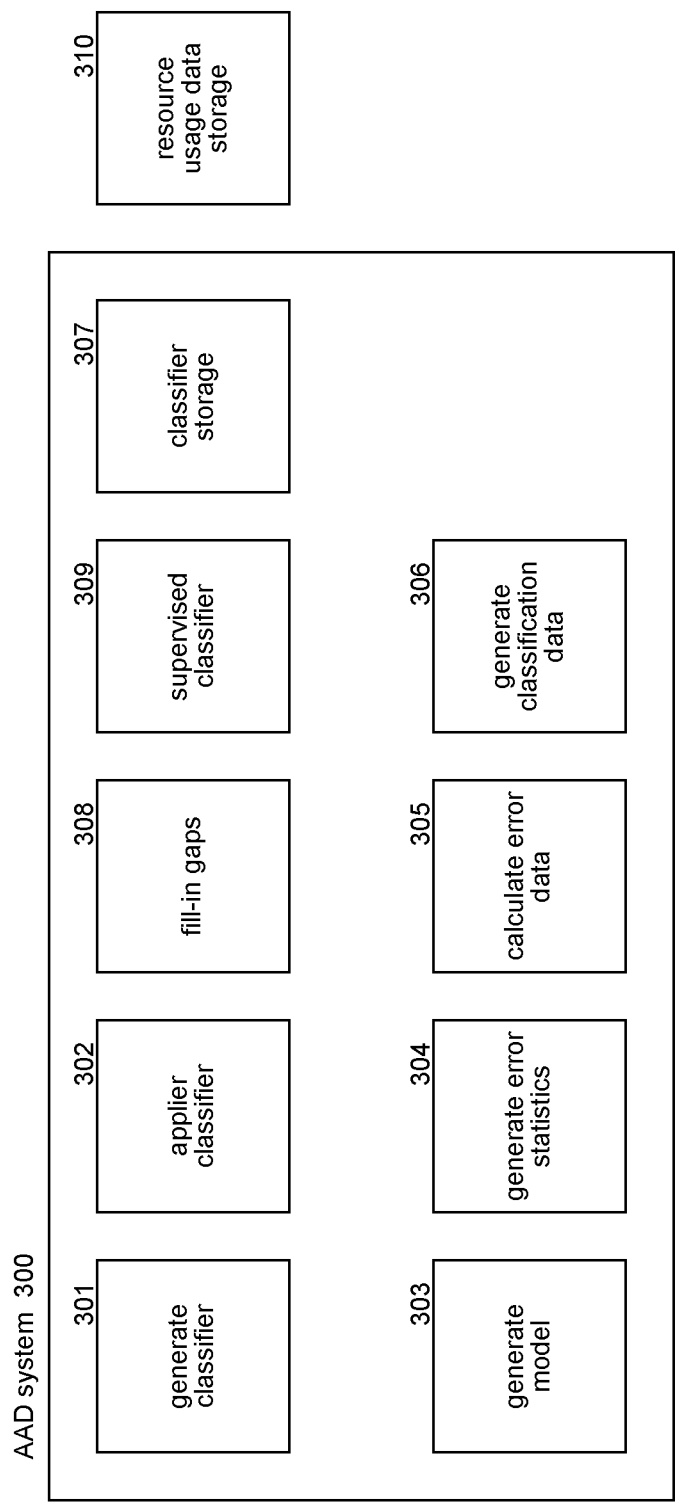
FIG. 3 is a block diagram that illustrates components of the AAD system in some embodiments.

FIG. 3 is a block diagram that illustrates components of the AAD system in some embodiments. The AAD system 300 includes a generate classifier component 301, an apply classifier component 302, a generate model component 303, a generate error statistics component 304, a calculate error data component 305, and a generate classification data component 306. The generate classifier component is invoked periodically to generate a classifier based on the most recent resource usage data (e.g., the past 60 days). The apply classifier component is invoked at various time intervals to determine whether abnormal resource usage is occurring. The generate model component is invoked to generate a prediction model for a resource. The generate error statistics component is invoked to generate error statistics for the resources to estimate the error in the generated prediction models. The calculate error data component is invoked to calculate the error data for a prediction model. The generate classification data component is invoked to generate the classification data for use in generating the classifier and in applying the classifier. The AAD system also includes a classifier storage 307 to store the weights for the prediction models, the error statistics, and the abnormal resource usage criterion. The AAD system retrieves usage data from the resource usage data storage 310 of the data center. The ADD system may also include a fill-in gaps component 308 to fill in gaps in the resource usage data and a supervised classifier component 309 to filter out activity that has been erroneously identified as abnormal activity.

The computing devices and systems on which the AAD system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing devices may include desktop computers, laptops, tablets, e-readers, personal digital assistants, smartphones, gaming devices, servers, and computer systems such as massively parallel systems. The computing devices may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage means. The computer-readable storage media may have recorded on it or may be encoded with computer-executable instructions or logic that implements the AAD system. The data transmission media is used for transmitting data via transitory, propagating signals or carrier waves (e.g., electromagnetism) via a wired or wireless connection.

The AAD system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the AAD system may be implemented in hardware using, for example, an application-specific integrated circuit (ASIC).

Figure 4:
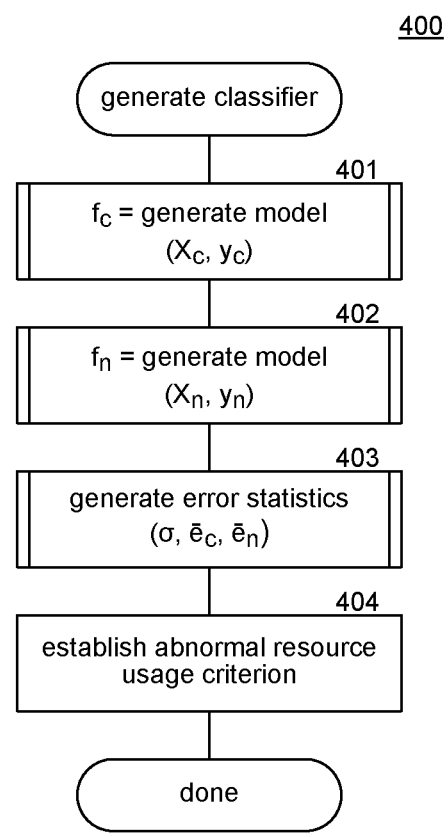
FIG. 4 is a flow diagram that illustrates the processing of a generate classifier component in some embodiments.

FIG. 4 is a flow diagram that illustrates the processing of a generate classifier component in some embodiments. The generate classifier component 400 is invoked to generate the classifier. In block 401, the component invokes the generate model component passing for each time interval classification data that includes features for the cores resource ($X_c$) and the corresponding current resource usage data ($y_c$) for that time interval and receives the weights for the features for the model ($f_c$) in return. A subset of the features of the classification data may be represented by the following table:

| Time | 0 hour | 1 hour | ... | 8 hours | 1 day | ... | 14 days |
|---|---|---|---|---|---|---|---|
| 0 | 10000 | 9500 | | 5500 | 9750 | | 10500 |
| −1 | 9500 | 10250 | | | | | |
| −2 | 10250 | 7500 | | | | | |
| −3 | 7500 | 6500 | | | | | |
| −4 | 6500 | 7000 | | 11000 | 9000 | | 7000 |
| −5 | 7000 | | | | | | |
| ... | | | | | | | |

The time column represents the time for the data in each row. Time 0 represents the current time, time −1 represents one hour ago, time −2 represents two hours ago, and so on. The 0 hour column represents the current resource usage data ($y_c$) for the corresponding time. For example, four hours ago the average number of cores that were in use was 6500. The other columns represent the extracted features ($X_c$) for the corresponding time. The illustrated extracted features include the number of cores in use one hour ago, eight hours ago, one day ago, and 14 days ago. For example, four hours ago the extracted features were 7000, 11000, 9000, and 7000. In block 402, the generate classifier component invokes the generate model component passing for each time interval classification data that includes features for the subscriptions resource ($X_n$) and the corresponding resource usage data ($y_n$) for that time interval and receives the weights for the features for the model ($f_n$) in return. In block 403, the component invokes a generate error statistics component and receives the error statistics in return such as a covariance matrix and the mean of the errors for each resource. In block 404, the component establishes the abnormal resource usage criterion as a p-value for a multivariate normal distribution based on a threshold significance level. The p-value may be generated based on a Mahalanobis distance or based on the estimated weight of a cumulative distribution function in a rectangle of values higher than the observed values. (See Genz, A. and Bretz, F., "Computation of Multivariate Normal and t Probabilities," Springer Science & Business Media (2009).) The component then completes.

In some embodiments, the resource usage data collected at a data center may have gaps or may have been collected during a period of abnormal activity. A gap may be present because, for example, a component of the data center responsible for collecting the data may have failed or may have been taken down for maintenance. The resource usage data that is collected during a period of abnormal activity might not be useful in predicting normal resource usage data. Such a period may be considered a gap in the collecting of normal resource usage data. To fill in the gaps, a fill-in gap component may use various interpolation techniques such as a linear Gaussian Bayesian network or linear interpolation. With a Bayesian network, the missing data can be imputed using forward sampling with likelihood weighting or using belief propagation.

Figure 5:
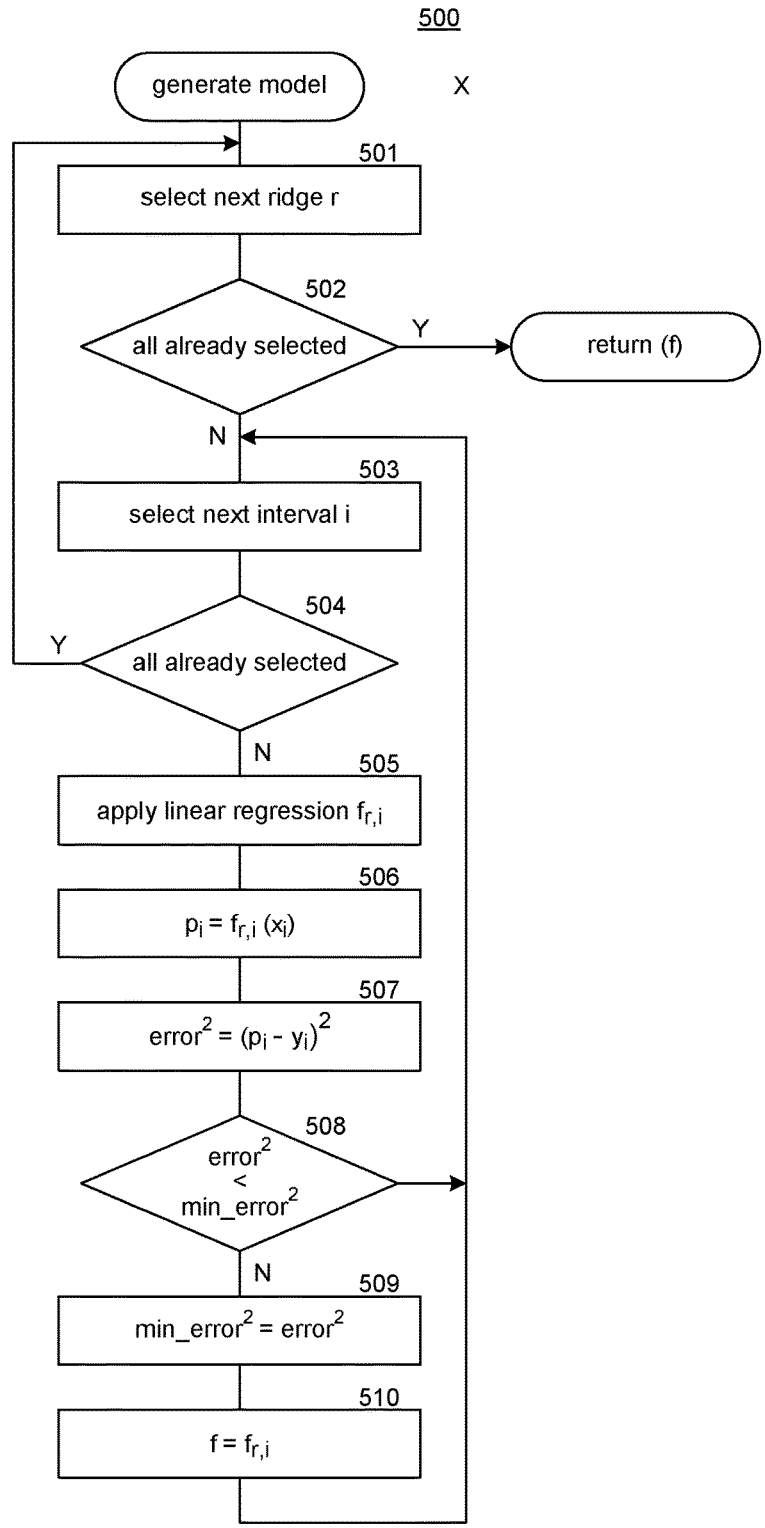
FIG. 5 is a flow diagram that illustrates the processing of a generate model component in some embodiments.

FIG. 5 is a flow diagram that illustrates the processing of a generate model component in some embodiments. The generate model component 500 is invoked to generate a prediction model for a resource based on current usage data and extracted features for various time intervals. The component uses a ridge regression model although as described above other models may be employed. The component generates prediction models for various ridge values and selects the prediction model with the smallest error. The ridge values may be a logarithm set including the values $10^0$, $10^1$, $10^2$, ..., $10^{12}$. For each ridge value, the component generates various prediction models using different subsets of the time intervals and calculates the error from the remaining time intervals. In block 501, the component selects the next ridge value. In decision block 502, if all the ridge values have already been selected, then the component returns the prediction model (i.e., the weights for the features), else the component continues at block 503. In block 503, the component selects the next time interval. In decision block 504, if all the time intervals have already been selected for the selected ridge, then the component loops to block 501 to select the next ridge, else the component continues at block 505. In block 505, the component applies a linear regression technique to generate the prediction model using the selected ridge based on the subset of intervals that does not include the selected interval. In block 506, the component uses the generated model to predict predicted resource usage data for the selected time interval. In block 507, the component calculates the error between the predicted resource usage data and the current resource usage data. In decision block 508, if the error is less than the minimum error encountered so far, then the component continues at block 509, else the component loops to block 503 to select the next time interval. In block 509, the component sets the minimum error encountered so far to the error calculated in block 507. In block 510, the component sets the prediction model to the prediction model generated in block 505. The component then loops to block 503 to select the next time interval. Although the component is illustrated as generating a prediction model for each time interval for each ridge value, the component may generate prediction models for larger subsets of the time intervals rather than for each time interval, which may produce acceptable prediction models with less computational resources.

Figure 6:
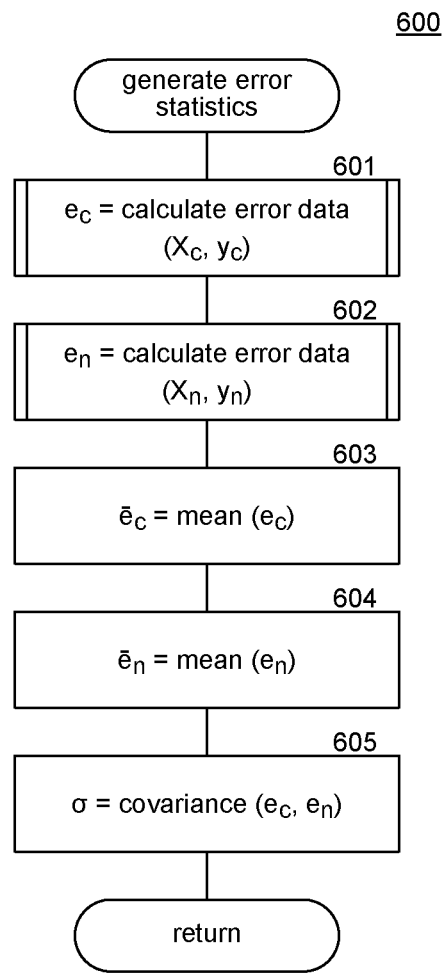
FIG. 6 is a flow diagram that illustrates the processing of a generate error statistics component in some embodiments.

FIG. 6 is a flow diagram that illustrates the processing of a generate error statistics component in some embodiments. The generate error statistics component 600 generates error statistics for the prediction model using cross-validation to estimate the error. In block 601, the component invokes a calculate error data component passing the current resource usage data and extracted features for the time intervals for the cores resource and receives the error data ($e_c$) in return. In block 602, the component invokes the calculate error data component passing the current resource usage data and extracted features for the time intervals for the subscriptions resource and receives the error data ($e_n$) in return. In block 603, the component calculates the mean for the error data of the cores resource. In block 604, the component calculates the mean for the error data of the subscriptions resource. In block 605, the component calculates a covariance matrix based on the error data for the cores resource and the subscriptions resource and then returns.

Figure 7:
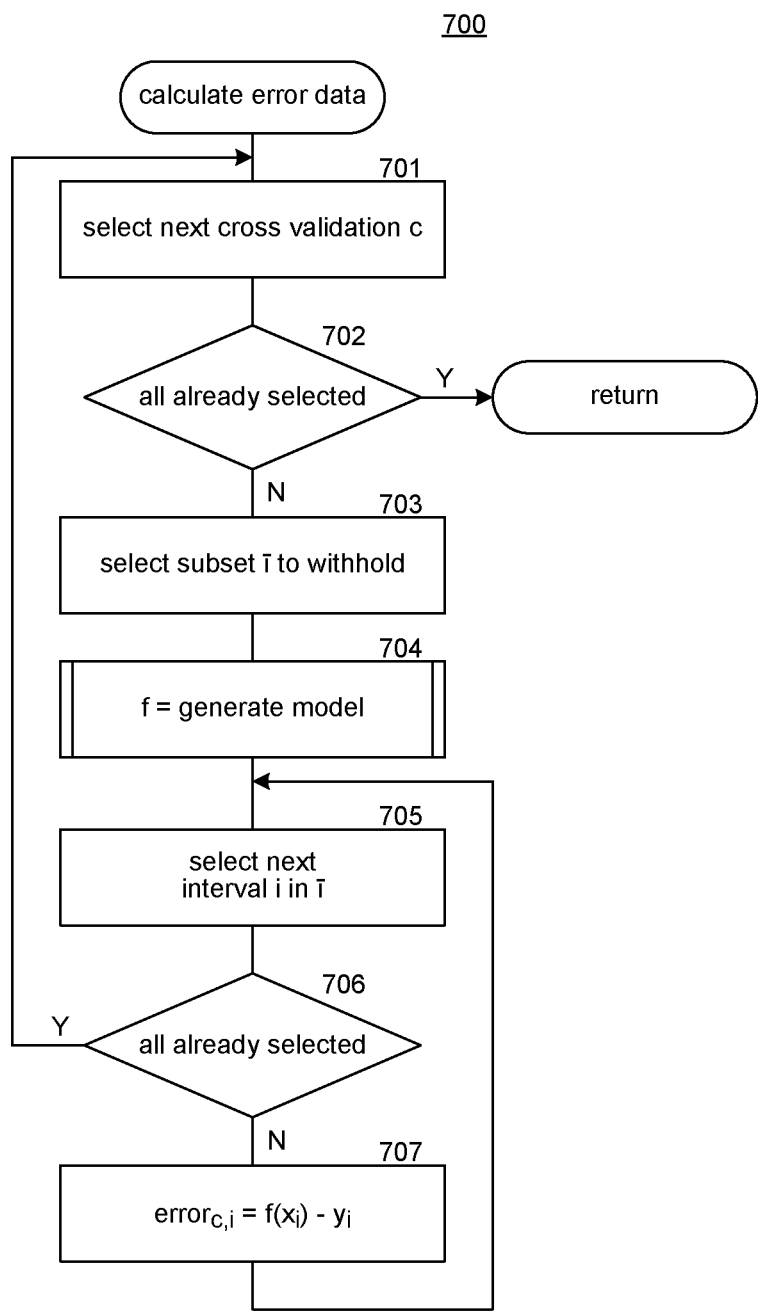
FIG. 7 is a flow diagram that illustrates the processing of a calculate error data component in some embodiments.

FIG. 7 is a flow diagram that illustrates the processing of a calculate error data component in some embodiments. The calculate error data component 700 generates a prediction model based on various subsets of the time intervals, uses the prediction model to predict predicted resource usage data for the remaining intervals, and calculates the error between the predicted resource usage data and the current resource usage data for that time interval. The component may generate five prediction models withholding a different 20% of the intervals for each prediction model. In block 701, the component selects the next cross-validation. In decision block 702, if all the cross-validations have already been selected, then the component returns, else the component continues at block 703. In block 703, the component selects a subset of the time intervals to withhold. In block 704, the component invokes the generate model component passing an indication of the current resource usage data and features that have not been withheld. In blocks 705-707, the component uses the generated prediction model to calculate the error between predicted resource usage data and current resource usage data for the withheld intervals. In block 705, the component selects the next withheld interval. In decision block 706, if all the withheld intervals have already been selected, then the component loops to block 701 to select the next cross-validation, else the component continues at block 707. In block 707, the component calculates the error for the selected interval and then loops to block 705 to select the next cross-validation.

Figure 8:
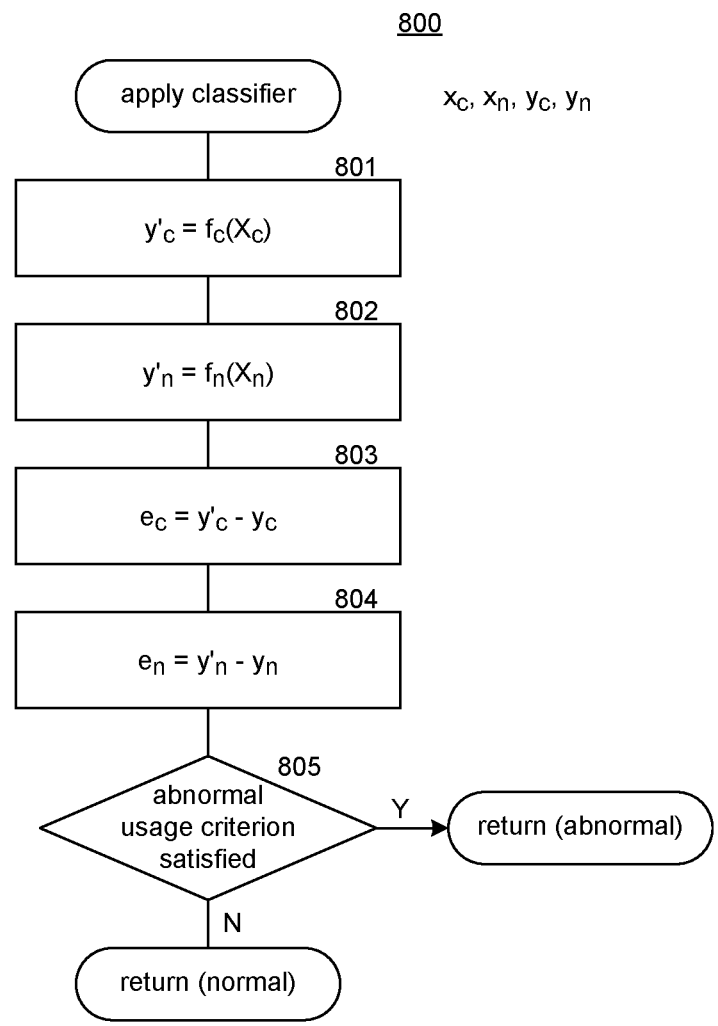
FIG. 8 is a flow diagram that illustrates the processing of an apply classifier component in some embodiments.

FIG. 8 is a flow diagram that illustrates the processing of an apply classifier component in some embodiments. The apply classifier component 800 is passed an indication of the features for the resources and determines whether the current resource usage data when compared to the predicted resource usage data indicates an abnormal resource usage. In block 801, the component applies the prediction model for the cores resource to the features for the cores resource to predict resource usage data. In block 802, the component applies the prediction model for the subscriptions resource to the features for the subscriptions resource to predict resource usage data. In block 803, the component calculates the error between the predicted resource usage data and the current resource usage data for the cores resource. In block 804, the component calculates the error between the predicted resource usage data and the current resource usage data for the subscriptions. In decision block 805, if the errors satisfy an abnormal resource usage criterion, then the component returns an indication that the resource usage is abnormal, else the component returns an indication that the resource usage is normal.

In some embodiments, the AAD system may generate a supervised classifier to filter out erroneous indications of abnormal resource usage. The AAD system may use as training data for the supervised classifier the resource usage data that has been indicated as being abnormal and labels (e.g., manually generated) that identify the resource usage data as being normal or abnormal. Once the training data is generated, the AAD system may use any of a variety of supervised training techniques such as an SVM, decision trees, adaptive boosting, and so on. After the AAD system initially indicates abnormal resource usage data, the supervised classier component can then input the features for that abnormal resource usage data and classify as being normal or abnormal.

Figure 9:
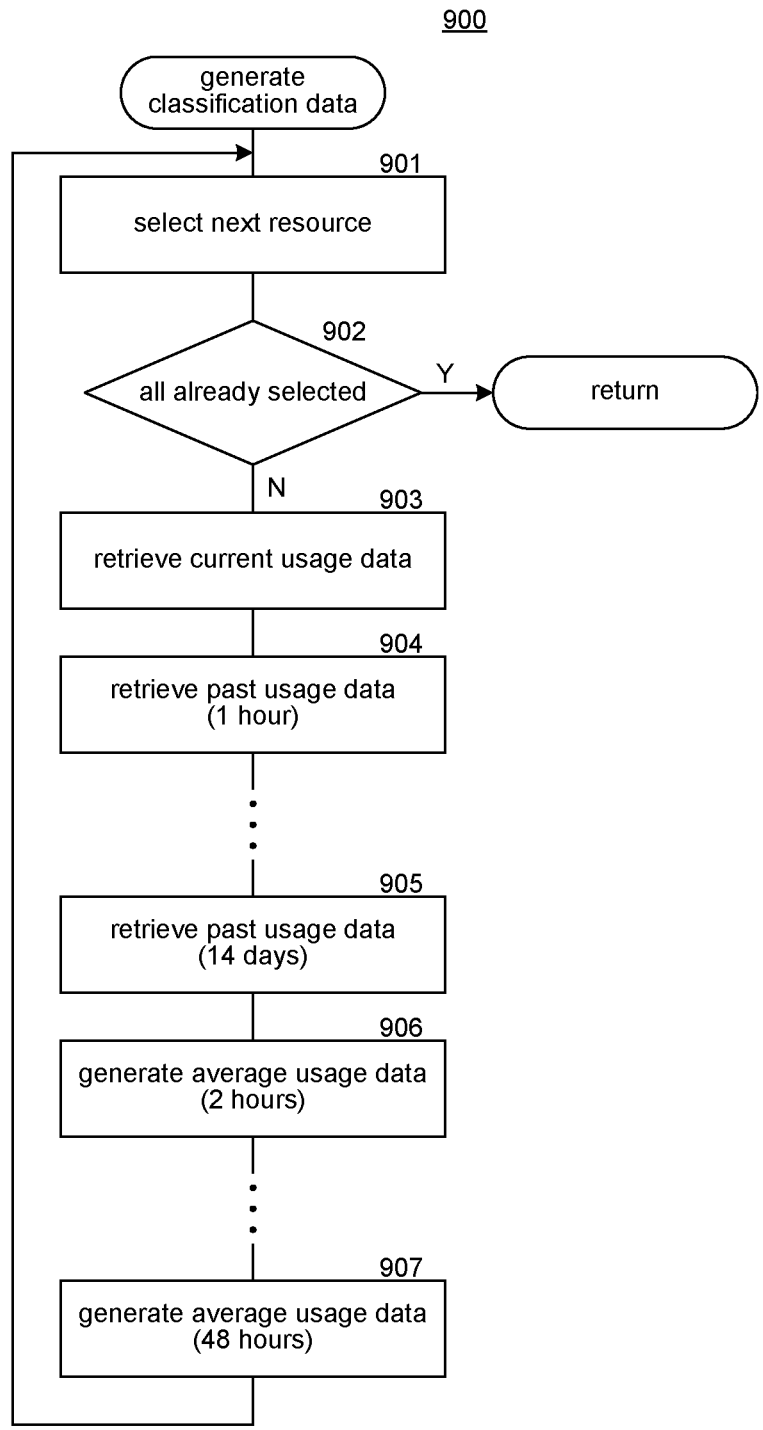
FIG. 9 is a flow diagram that illustrates the processing of a generate classification data component in some embodiments.

FIG. 9 is a flow diagram that illustrates the processing of a generate classification data component in some embodiments. The generate classification data component 900 generates the current classification data for the resources. In block 901, the component selects the next resource. In decision block 902, if all the resources have already been selected, then the component returns, else the component continues at block 903. In block 903, the component retrieves the current resource usage data for the selected resource. In block 904, the component retrieves past resource usage data for one hour ago for the selected resource. In block 905, the component retrieves past resource usage data for 14 days ago for the selected resource. The ellipsis between block 904 and block 905 indicates that past resource usage data may be retrieved for other intervals. In block 906, the component generates an average resource usage data over the past two hours for the selected resource. In block 907, the component generates average resource usage data for the last 48 hours for the selected resource and then loops to block 901 to select the next resource.

Generating a Classifier

In some embodiments, a method performed by a computer system for generating a classifier to identify abnormal resource usage in a data center is provided. The method, for each of a plurality of resources, provides resource usage data for that resource at various times. The method, for each of a plurality of times, identifies current resource usage data for that resource for that time and extracts features from past resource usage data of that resource prior to that time. The method generates a prediction model for that resource from the current resource usage data and the extracted features for the times to predict resource usage data for that resource at a current time given features extracted from past resource usage data. The method then generates from the resource usage data for the resources error statistics for the prediction models and establishes from the error statistics an abnormal resource usage criterion. The method may be used in conjunction with any one of or any combination of the following embodiments. In some embodiments, the method may further, for each of the plurality of resources, provide current resource usage data for a current time and past resource usage data for that resource, extract features from the past resource usage data for that resource, generate by the prediction model for that resource predicted resource usage data for the current time, and determine error between the predicted resource usage data and the current resource usage data. When the determined errors satisfy the abnormal resource usage criterion, the method may indicate abnormal resource usage has occurred. In some embodiments, a resource may be cores of the data center and the resource usage data for the cores may be the number of cores in use at the data center. The extracted features for the number of cores may include the average number of cores in use during past intervals. A resource may also be subscriptions to the data center and the resource usage data for the subscriptions may be the number of new subscriptions to the data center. The extracted features for subscriptions may the number of new subscriptions during past intervals. In some embodiments, the error statistics may be generated using cross-validation of a prediction model. In some embodiments, the method may further regenerate the classifier on a periodic basis. In some embodiments, the error statistics may include a mean of the errors for each resource and a covariance for each pair of resources. In some embodiments, the abnormal resource usage criterion may be based on a p-value for the error statistics.

Identifying Abnormal Resource Usage

In some embodiments, a computer-readable storage medium is provided that stores computer-executable instructions for controlling a computing system to identify abnormal resource usage in a data center. The computer-executable instructions comprising instructions that access a prediction model for each of a plurality of resources and an abnormal resource usage criterion where the prediction models may be generated from resource usage data of the data center and where the abnormal resource usage criterion may be established based on error statistics for the prediction models. The instructions further, for each of a plurality of resources of the data center, access current resource usage data for a current time and past resource usage data for that resource, extract features from the past resource usage data for that resource, predict by the prediction model for that resource predicted resource usage data for the current time based on the extracted features, and determine an error between the predicted resource usage data and the current resource usage data. The instructions further, when the determined errors satisfy the abnormal resource usage criterion, indicate an abnormal resource usage has occurred. These instructions may be used in conjunction with any one of or any combination of the following embodiments. In some embodiments, a resource may be cores of the data center and a resource may be subscriptions to the data center. In some embodiments, the extracted features for the number of cores may include the average number of cores in use during past intervals and the extracted features for subscriptions may include the number of new subscriptions received during past intervals. In some embodiments, the instructions further, for each of the plurality of resources of the data center, collect resource usage data for that resource at each of a plurality of intervals and wherein the extracted features include resource usage data for time intervals of one hour, one day, and one week prior to the current time. In some embodiments, the instructions may further when an abnormal resource usage has been indicated, apply a supervised classifier to the extracted features to filter out erroneous indications of abnormal resource usage.

In some embodiments, a computer system that identifies abnormal resource usage in a data center is provided. The computer system may comprise one or more computer-readable storage media storing computer-executable instructions and one or more processors for executing the computer-executable instructions stored in the one or more computer-readable storage media. The instructions may include instructions that access current resource usage data for a current time and features of past resource usage data for resources of the data center, and apply a classifier to the current resource usage data and the features to determine whether the current resource usage data represents an abnormal resource usage. The classifier may, for each of a plurality of resources of the data center, predict using a prediction model for that resource predicted resource usage data for the current time based on the features and determine an error between the predicted resource usage data and the current resource usage data and when the determined errors satisfy the abnormal resource usage criterion, indicate an abnormal resource usage has occurred. These instructions may be used in conjunction with any one of or any combination of the following embodiments. In some embodiments, the instructions further include instructions for generating the classifier that, for each of the plurality of resources, for each of a plurality of times, identify current resource usage data for that resource for that time and extract features from past resource usage data for that resource and then generate a prediction model for that resource from the current resource usage data and the extracted features for the times to predict resource usage data for that resource at a current time given features extracted from past resource usage data. In some embodiments, the instructions may further include instructions that generate from the resource usage data for the resources error statistics for the prediction models and establish from the error statistics an abnormal resource usage criterion. In some embodiments, the classifier is regenerated at various times using resource usage data that includes resource usage data collected since the classifier was last generated. In some embodiments, the prediction models may be generated using a linear regression technique. In some embodiments, a resource may be cores of the data center and a resource may be subscriptions to the data center. In some embodiments, the extracted features for the number of cores may include the average number of cores in use during past intervals, and the extracted features for subscriptions may include the number of new subscriptions during past intervals. In some embodiments, the instructions may further when an abnormal resource usage has been indicated, apply a supervised classifier to the extracted features to filter out erroneous indications of abnormal resource usage.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method, comprising:
accessing current resource usage data for a resource in a data center for a current time and past resource usage data for the resource for a time prior to the current time; and
applying a classifier to determine whether the current resource usage data represents an abnormal resource usage, wherein the classifier:
predicts using a prediction model for the resource predicted resource usage data for the current time based on the past resource usage data;
determines an error between the predicted resource usage data and the current resource usage data; and
when the determined error satisfies an abnormal resource usage criterion, indicating that an abnormal resource usage of the resource in the data center has occurred.

2. The method of claim 1 further comprises generating a classifier by:
for each of a plurality of times, identifying current resource usage data for the resource for that time and past resource usage data for the resource at a time prior to that time;
generating a prediction model for the resource based on the identified current resource usage data and the identified past resource usage data for the times to predict resource usage data for the resource at a future time given past resource usage data for the resource at a time prior to that future time;
generating, from the resource usage data for the resource, error statistics for the prediction model; and
establishing from the error statistics an abnormal resource usage criterion.

3. The method of claim 2 wherein the classifier is regenerated at various times using resource usage data that includes resource usage data collected since the classifier was last generated.

4. The method of claim 2 wherein the prediction model is generated using a linear regression technique.

5. The method of claim 1, wherein a resource is cores of the data center and a resource is subscriptions to the data center and wherein the method further comprises extracting for a number of cores the average number of cores in use during past intervals and for subscriptions a number of new subscriptions during past intervals and generating the classifier using the extracted features.

6. The method of claim 1 further comprises identifying and filling in gaps in the past resource usage data.

7. A system, comprising:
at least one processor and at least one memory;
wherein the at least one memory includes instructions that when executed on the at least one processor perform actions that:
accesses current resource usage data for a resource in a data center for a current time and past resource usage data for the resource for a time prior to the current time; and
applies a classifier to determine whether the current resource usage data represents an abnormal resource usage, wherein the classifier:
predicts using a prediction model for the resource predicted resource usage data for the current time based on the past resource usage data;
determines an error between the predicted resource usage data and the current resource usage data; and
when the determined error satisfies an abnormal resource usage criterion, indicating that an abnormal resource usage has occurred.

8. The system of claim 7, wherein the resource is at least one core of the data center and the resource usage data represents a number of cores in use at the data center.

9. The system of claim 7, wherein the resource is at least one subscription to the data center and the resource usage data represents a number of new subscriptions to the data center.

10. The system of claim 7, wherein error statistics are generated using cross-validation of the prediction model.

11. The system of claim 7, wherein the prediction model is regenerated on a periodic basis.

12. The system of claim 7, wherein a prediction model is generated for each of a plurality of resources.

13. The system of claim 7, wherein the prediction model is generated based on features extracted from the past resource usage data.

14. A device, comprising:
one or more processors and one or more memory devices;
wherein the one or more processors are configured to:
monitor current resource usage data for at least one resource in a data center for a current time and past resource usage data for the resource for a time prior to the current time; and
determine whether the current resource usage data represents an abnormal resource usage through actions that:
predict using a prediction model for the resource predicted resource usage data for the current time based on the past resource usage data;
determine an error between the predicted resource usage data and the current resource usage data; and
when the determined error satisfies an abnormal resource usage criterion, indicate that an abnormal resource usage has occurred.

15. The device of claim 14, wherein the resource is at least one core of the data center and the resource usage data represents a number of cores in use at the data center.

16. The device of claim 14, wherein the resource is at least one subscription to the data center and the resource usage data represents a number of new subscriptions to the data center.

17. The device of claim 14, wherein error statistics are generated using cross-validation of the prediction model.

18. The device of claim 14, wherein the prediction model is regenerated on a periodic basis.

19. The device of claim 14, wherein a prediction model is generated for each of a plurality of resources.

20. The device of claim 14, wherein the prediction model is generated based on features extracted from the past resource usage data.

\* \* \* \* \*